(12) United States Patent
Barrade et al.

(10) Patent No.: US 8,482,263 B2
(45) Date of Patent: Jul. 9, 2013

(54) RAPID TRANSFER OF STORED ENERGY

(75) Inventors: Philippe Barrade, Chavannes-prés-Renens (CH); Yves Birbaum, Granges (CH); Frederic Vexo, Bussigny-Pres-Lausanne (CH); Pascal Eichenberger, Blonay (CH)

(73) Assignee: Logitech Europe S.A. (CH)

( * ) Notice: Subject to any disclaimer, the term of this patent is extended or adjusted under 35 U.S.C. 154(b) by 975 days.

(21) Appl. No.: 12/508,261

(22) Filed: Jul. 23, 2009

(65) Prior Publication Data

US 2010/0026248 A1 Feb. 4, 2010

Related U.S. Application Data

(60) Provisional application No. 61/085,807, filed on Aug. 1, 2008.

(51) Int. Cl.
*H02J 7/00* (2006.01)

(52) U.S. Cl.
USPC ............................ 320/166; 320/103; 320/167

(58) Field of Classification Search
USPC ........................................................ 320/166
See application file for complete search history.

(56) References Cited

U.S. PATENT DOCUMENTS

| | | | |
|---|---|---|---|
| 6,265,851 B1 * | 7/2001 | Brien et al. | 320/162 |
| 6,434,032 B1 | 8/2002 | Romano | |
| 7,436,150 B2 * | 10/2008 | Daboussi | 320/118 |
| 8,148,954 B1 | 4/2012 | Kehlstadt et al. | |
| 2005/0130682 A1 | 6/2005 | Takara et al. | |
| 2005/0253553 A1 | 11/2005 | Phillips et al. | |
| 2007/0236180 A1 | 10/2007 | Rodgers | |
| 2008/0014827 A1 | 1/2008 | Amireh et al. | |
| 2008/0106239 A1 * | 5/2008 | Cegnar | 320/167 |
| 2008/0311795 A1 * | 12/2008 | Brotto et al. | 439/628 |
| 2008/0315829 A1 * | 12/2008 | Jones et al. | 320/103 |
| 2009/0033286 A1 * | 2/2009 | Rosa et al. | 320/135 |
| 2009/0140575 A1 | 6/2009 | McGee et al. | |

FOREIGN PATENT DOCUMENTS

JP 2007-033752 2/2007

OTHER PUBLICATIONS

Barrade, P., "Series Connection of Supercapacitors: Comparative Study of Solutions for the Active Equalizaiton of the Voltages," 6 pages, 2000.
Cerovsky, Z., et al., "DC-DC Converter for Charging and Discharging Super-Capacitors Used in Electric Hybrid Cars," Czech Technical University, Prague, Czech Republic, 8 pages, 2001.

(Continued)

*Primary Examiner* — Edward Tso
*Assistant Examiner* — Johali Torres Ruiz
(74) *Attorney, Agent, or Firm* — Fenwick & West LLP (57) ABSTRACT

A disclosed method (and system) corresponds to rapidly charging a rechargeable device. An embodiment of the method comprises charging a first supercapacitor attached to a charging unit. In response to the device coupling to the charging unit, determining whether the charging unit is authorized to charge the device. The first supercapacitor discharging in response to the determining that the charging unit is authorized to charge the device, the discharging of the first supercapacitor resulting in a first current being generated. The first current is transferred to the device through an output of the charging unit for charging a second supercapacitor included in the device. The amount of the first current generated is regulated. In response to the to the voltage at the output increasing at a rate above a set threshold, reducing the rate at which the voltage is increasing.

26 Claims, 9 Drawing Sheets

OTHER PUBLICATIONS

Destraz, B., et al., "A New Interleaved Multi-channel DC/DC Converter Specially Dedicated to Low Voltage, High Current Applications," International Exhibition & Conference For Power Electronics, Intelligent Motion and Power Quality, 2006, Nuremberg, Germany, 6 pages.

Li, R., et al., "Design and Implementation of a Hybrid Energy Supply System for Railway Vehicles," 20th Annual IEEE Applied Power Electronics Conference and Exposition, APEC 2005, 7 pages.

Linear Technology Corporation, "High Speed Dual, Multiphase Step-Down DC/DC Controller," LTC3811, 2007, Milpitas, California, 48 pages.

Mindl, P., "Hybrid Drive Super-Capacitor Energy Storage Calculation," CVUT FEL—Research Centre of JB, Praha, Czech Republic, 4 pages, 2003.

Rufer, A., et al., "A Supercapacitor-Based Energy-Storage Substation for Voltage-Compensation in Weak Transportation Networks," IEEE Transactions on Power Delivery, Apr. 2004, vol. 19, No. 2, 8 pages.

Thounthong, P., et al., "Fuel Cell and Supercapacitors for Automotive Hybrid Electrical System," ECTI Transactions on Electrical Eng., Electronics and Commuications, Feb. 2005, vol. 3, No. 1, pp. 2030.

Zhiping, Q., "Study on Super-capacitor Energy Storage Technology and its Application in Power System," Oct. 2006, The Institute of Electrical Engineering, CAS, 27 pages.

German Patent and Trademark Office, Office Action, German Patent Application No. 10 2009 035 450.6, Apr. 11, 2012, 12 pages.

Chinese State Intellectual Property Office of the People's Republic of China, Chinese Patent Application No. 2009-10160890.1, twenty-two pages.

\* cited by examiner

RAPID TRANSFER OF STORED ENERGY

CROSS-REFERENCE TO RELATED APPLICATION

This application claims the benefit of U.S. Provisional Application No. 61/085,807, filed Aug. 1, 2008, which is hereby incorporated herein by reference.

BACKGROUND

1. Field of the Art

The subject matter pertains in general to rapidly charging a device using supercapacitors.

2. Description of the Related Art

A majority of the portable electronic devices that are used by people on a daily basis rely on rechargeable batteries to power the devices. Devices such as cameras, remote controllers, cell phones, laptops, portable music players, and cordless telephones are designed to operate using power from a battery, and in many instances, a rechargeable battery.

A problem with a device powered by a rechargeable battery is that the device can become discharged before the user realizes a need to recharge the battery. As the device becomes inoperable due to a lack of charge in the battery, the user must couple the battery (either directly or indirectly through the device) to a charging unit for an extended period of time until the battery is recharged. As the battery recharges, the device remains inoperable, leaving the user unproductive relative to use of the device and potentially frustrated in their experience with the device.

Thus, the current state of the art lacks, inter alia, a method and system to rapidly recharge a device.

SUMMARY

A method (and system) for rapidly charging a rechargeable device. An embodiment of the method comprises charging a first supercapacitor attached to a charging unit. In response to the device coupling to the charging unit, determining whether the charging unit is authorized to charge the device. The first supercapacitor discharging in response to the determining that the charging unit is authorized to charge the device, the discharging of the first supercapacitor resulting in a first current being generated. The first current is transferred to the device through an output of the charging unit for charging a second supercapacitor attached the device. The amount of the first current generated is regulated. In response to the voltage at the output increasing at a rate above a set threshold, reducing the rate at which the voltage is increasing.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed method (or system) for purposes of illustration only. One skilled in the art will readily recognize from the following description that alternative embodiments of the structures and methods illustrated herein may be employed without departing from the principles described herein.

Charging System Architecture

Figure 1A:
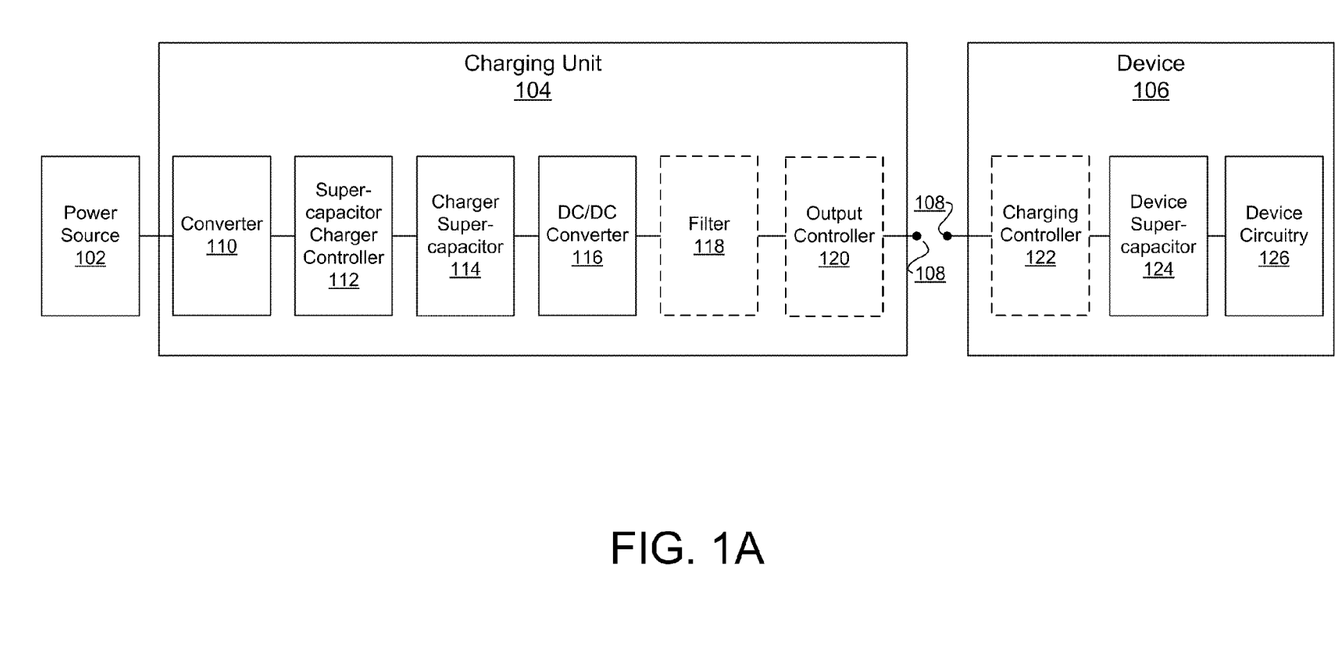
FIG. 1A is a high-level block diagram illustrating a charging system including a power source, a charging unit, and a device according to one embodiment.

FIG. 1A is a high-level block diagram illustrating a charging system including a power source 102, a charging unit 104, and a device 106 according to one embodiment. The power source 102 couples to an input of the charging unit 104 and an output of the charging unit 104 couples to the device 106 by coupling 108. In one embodiment, coupling 108 is a conductive coupling. In another embodiment, coupling 108 is an inductive coupling.

The power source 102 provides the input of the charging unit 104 with power. In one embodiment, the power source 102 is an AC power source, which provides an alternating current (AC) to the input of the charging unit 104. In one embodiment, the AC power source provides input power from a wall socket with approximately 100 to 240 volts (V), 50 to 60 hertz (Hz). In another embodiment, the power source 102 is a direct current (DC) power source, for example, power from a Universal Serial Bus (USB) port. The DC power source provides a direct current (DC) to the input of the charging unit 104. The DC current may for example be between 100 milliamperes (mA) and 500 mA.

When the output of the charging unit 104 is coupled to the device 106 by coupling 108, stored energy in the charging unit 104 is rapidly transferred to the device 106. In one embodiment, the stored energy in the charging unit 104 is transferred to the device 106 in the form of a high current (e.g., 2-40 amperes (or A or Amps)). The rapid energy transfer allows the device 106 to become charged within a short amount of time (e.g., 3-5 seconds).

In one embodiment, the charging unit 104 includes a converter 110, a supercapacitor charger controller 112, a charger supercapacitor 114, a DC/DC converter 116, a filter 118, and an output controller 120. In one embodiment, the device 106 includes a charging controller 122, a device supercapacitor 124, and device circuitry 126.

If the charging unit 104 is configured to be coupled to an AC power source, the converter 110 is an AC/DC converter. Alternatively, if the charging unit 104 is configured to be coupled to a DC power source, the converter 110 is a DC/DC converter. An input of the converter 110 is coupled to the power source 102 and receives current driven by the power source 102. If the converter 110 is an AC/DC converter, the AC/DC converter converts the AC current received from the power source 102 to DC current. The DC current is output by the AC/DC converter to an input of the supercapacitor charger controller 112. Alternatively, if the converter 110 is a DC/DC converter, the DC/DC converter receives the DC current from the power source 102 and outputs DC current to the input of the supercapacitor charger controller 112.

The supercapacitor charger controller 112 controls the charging of the charger supercapacitor 114. The supercapacitor charger controller 112 outputs the current received from the converter 110 to an input of the charger supercapacitor 114. The current from the supercapacitor charger controller 112 charges the charger supercapacitor 114. In one embodiment, the current used to charge the charger supercapacitor 114 is a low current (e.g., 100 mA-500 mA), which prevents the charging unit 104 from putting too much strain on the power source 102.

When the supercapacitor charger controller 112 determines that the voltage of the charger supercapacitor 114 has reached maximum voltage, the supercapacitor charger controller 112 requests less current from the converter 110 or reduces the current being received from the converter 110. The supercapacitor charger controller 112 slowly decreases the current being transferred to the charger supercapacitor 114 to zero amperes. If the supercapacitor charger controller 112 detects that the voltage of the charger supercapacitor 114 decreases below its maximum voltage, the supercapacitor charger controller 112 trickle charges the charger supercapacitor 114 by requesting current from the converter 110 and transferring the current to the charger supercapacitor 114.

The output controller 120 of FIG. 1A is represented in dashed lines to indicate that the output controller 120 is optional, i.e., it does not need to be included in the charging unit 104. In configurations in which the output controller 120 is included in the charging unit 104 and the device 106 becomes coupled to the charging unit 104 through the coupling 108, the output controller 120 communicates with the device 106 to identify the device 106. The output controller 120 identifies the device 106 to determine whether the charging unit 104 is authorized to charge the device 106. With respect to authorization of devices coupled to the charging unit 104, when the device 106 couples to the charging unit 104, the device 106 transmits to the output controller 120 an identification code. The output controller 120 compares the received identification code to pre-stored identification numbers in a database or table within a storage, e.g., non-volatile memory or disk. The output controller 120 determines that the charging unit 104 is authorized to charge the device 106, if the received identification code matches a pre-stored identification number.

In another embodiment for authorization, the output controller 120 uses radio frequency identification (RFID) to determine if the charging unit 104 is authorized to charge the device 106. When the device 106 becomes coupled to the charging unit 104 or is within a specific distance of the charging unit 104, the output controller 120 sends a signal to an RFID tag attached to the device 106. In response, the RFID tag of the device 106 transmits radio signals back to the output controller 120. The output controller uses the radio signals from the RFID tag to identify the RFID tag and determine if the charging unit 104 is authorized to charge the device 106. Again, the output controller 120 can confirm the RFID tag against a pre-stored set of RFID tags that may be stored within a database or table in a storage medium, e.g., a non-volatile memory or disk.

It is noted that the authorization process may be used to ensure compatibility of the charging unit 104 with multiple devices for charging. The multiple devices can be of a same type or of two or more different types, e.g., a mouse, a keyboard, a remote controller, and/or a video game controller. Additionally, the authorization process is beneficial in that it insures that the device 106 coupled to charging unit 104 is capable of receiving and handling the rapid energy transfer from the charging unit 104.

If the output controller 120 determines that the charging unit 104 is authorized to charge the device 106, the charger supercapacitor 114 discharges releasing the stored energy in the charger supercapacitor 114. The energy is quickly transferred through the coupling 108 to the device 106 for charging the device supercapacitor 124. The release of the stored energy in the charger supercapacitor 114 results in a high current (e.g., 2-40 A) being generated for charging the device supercapacitor 124. The DC/DC converter 116 regulates the voltage from the output of the charger supercapacitor 114, which in turn allows the DC/DC converter 116 to also regulate the amount of current being output by the charger supercapacitor 114 as it rapidly discharges.

The filter 118 of FIG. 1A is represented in dashed lines to indicate that the filter 118 is optional, i.e., it does not need to be included in the charging unit 104. In one embodiment, the charging unit 104 only includes the filter 118, if the coupling 108 is a conductive coupling that requires direct contact. The filter 118 prevents rapid increase in voltage at the output of the charging unit 104. By preventing rapid increase in voltage at the output, the filter 118 lowers ripple current for the charging of the device supercapacitor 124. Additionally, as a result, the filter 118 prevents sparks from occurring at the conductive coupling between the charging unit 104 and the device 106. In configurations in which the coupling 108 is a conductive coupling, an input of the filter 118 receives the high current generated by the charger supercapacitor 114 and regulated by the DC/DC converter 116, and outputs the high current to an input of the output controller 120. The filter 118 acts as a buffer so that if the voltage at the output of the charging unit 104 increases and the rate at which it increases is above a set threshold, the filter 118 reduces the rate at which the voltage increases. By reducing the rate at which the voltage increases, it allows the DC/DC converter 116 to determine that the voltage is increasing and allow the DC/DC converter 116 to reduce voltage at the output of the charging unit 104.

By way of example, if during the rapid transfer of energy from the charging unit 104 to the device 106 a gap develops between the coupling 108 of the charging unit 104 and the device 106, the voltage at the output of the charging unit 104 rapidly increases. Eventually, the voltage increases enough to allow current to flow through the gap, which causes electrical arcs, or sparking. With the filter 118 included in the charging unit 104, the filter 118 reduces the rate at which the voltage increases, which allows the DC/DC converter 116 to recognize the increase in voltage and prevent the voltage from increasing. By preventing the voltage from increasing, sparks at the coupling 108 are avoided. It is noted that in configurations where the coupling 108 is an inductive coupling, there is no need for the filter 118 since there is no direct contact between the coupling 108, which means sparks cannot occur.

The input of the output controller 120 receives the high current output by the DC/DC converter 116 if the coupling 108 is an inductive coupling and receives the high current output by the filter 118 if the coupling 108 is a conductive coupling. In configurations in which the output controller 120 has determined that the charging unit 104 is authorized to charge the device 106, the output controller 120 outputs the high current to an input of the device 106. If no authorization is needed in the system configuration, the DC/DC converter 116 or the filter 118 directly outputs the high current to the input of the device 106.

The high current is transferred to the device 106 until the device 106 indicates to the charging unit 104 to stop the transfer of energy or until the charger supercapacitor 114 discharges to a specific voltage level. At the appropriate time, the DC/DC converter 116 stops the charger supercapacitor 114 from discharging. In one embodiment, the device 106 indicates to the charging unit 104 to stop the transfer of energy when the device supercapacitor 124 is fully charged. In one embodiment, the DC/DC converter 116 does not allow the charger supercapacitor 114 to discharge below half the maximum voltage of the charger supercapacitor 114. The DC/DC converter 116 measures the voltage of the charger supercapacitor and if the charger supercapacitor 114 discharges to half of its maximum voltage, the DC/DC converter 116 stops the charger supercapacitor 114 from discharging.

By only allowing the charger supercapacitor 114 to discharge to half of its maximum voltage, it allows the rapid transfer of energy to the device 106 without destroying the charger supercapacitor 114. If the charger supercapacitor 114 were allowed to discharge close to zero volts, the discharging current would have to be infinite based on the stored power in the charger supercapacitor 114 (Current=Power/Voltage). The maximum energy stored ($W_{MAX}$) in a supercapacitor is a function of the capacitance (C) and maximum voltage ($V_{MAX}$) of the supercapacitor, as shown below:

$$W_{MAX}=(1/2)*C*V_{MAX}^2$$

By only allowing the charger supercapacitor 114 to discharge to half of its maximum voltage, the usable energy ($W_U$) from the charger supercapacitor 114 that is transferred to the device 106 is 75% of the maximum energy ($W_{MAX}$) stored in the charger supercapacitor 114, as show below:

$$W_U=(1/2)*C*(V_{MAX}^2-V_{MIN}^2), \text{ when } V_{MIN}=(1/2)*V_{MAX}$$

$$W_U=0.75*W_{MAX}$$

The device 106 represents any type of electronic device. The charging controller 122 of FIG. 1A is represented in dashed lines to indicate that the charging controller 122 is optional, i.e., it does not need to be included in the device 106. In configurations in which the charging controller 122 is included in the device 106, the charging controller 122 communicates with the output controller 120 so that a determination can be made as to whether the charging unit 104 is authorized to charge the device 106. In one embodiment, when the device 106 becomes coupled with the charging unit 104, the charging controller 122 transmits information to the charging unit 104 that allows the charging unit 104 to identify the device 106 and determine whether the charging unit 104 is authorized to charge the device 106. In one embodiment, the information transferred is an identification code and the charging controller 122 includes a register pre-populated with the device's identification code.

If the charging unit 104 and the charging controller 122 determine that the device 106 is allowed to charge the device 106, an input of the charging controller 122 receives the high current output by the charging unit 104 and outputs the high current to an input of the device supercapacitor 124. The high current charges the device supercapacitor 124 within a short amount of time (e.g., 3-5 seconds).

In one embodiment, to protect the device supercapacitor 124, the device 106 includes a magnetic switch between the charging controller 122 and the device supercapacitor 124. The charging unit 104 includes a magnet. For example, the coupling 108 on the charging unit's side may be a magnetic contact. If the charging controller 122 detects the magnetic field of the magnet included in the device 106, the charging controller 122 communicates with the charging unit 104 to determine whether charging unit is authorized to charge the device 106. In one embodiment, the charging controller 122 detects the magnetic field when the device 106 becomes coupled with the charging unit 106. If a determination is made that the charging unit 104 is authorized to charge the device 106, the charging controller 122 closes the switch so that the device supercapacitor 124 can receive the high current from the charging unit 104. In one embodiment, the charging controller 122 opens the switch when the device 106 is no longer coupled to the charging unit 104.

In the case where the charging controller 122 is not included in the device 106, when the device 106 becomes coupled with the charging unit 104, the input of the device supercapacitor 124 receives the high current directly from the charging unit 104. After the device supercapacitor 124 has been fully charged by the high current, the charging unit 104 trickle charges the device supercapacitor by periodically transferring current to the device 106 when it is determined that the voltage of the device supercapacitor 124 is below its maximum voltage.

If the coupling 108 between the charging unit 104 and the device 106 is a conductive coupling sparks are prevented at the device 106 by reducing the parasitic inductance between the coupling 108 and device supercapacitor 124. To reduce the parasitic inductance, the wire between the coupling 108 and the device supercapacitor 124 must be as short as possible. Thus, sparks may be prevented by reducing the parasitic inductance and/or by including the filter 118 in the charging unit 104.

When the device 106 is no longer coupled to the charging unit 104, the device circuitry 126 is powered using the energy stored in the device supercapacitor 124. The device circuitry 126 represents the components of the device 106 that allow the device 106 to function. Rapidly transferring stored energy from the charger supercapacitor 114 to the device supercapacitor 124 is beneficial in that if a user of the device 106 notices that the device 106 is uncharged, the user can couple the device 106 to the charging unit 104 and within a short amount of time, the device 106 has enough stored energy in the device supercapacitor 124 to allow the user to use the device 106 for an extended period of time.

Supercapacitor Configuration

In order for the device supercapacitor 124 to become fully charged within a short amount of time, the charger supercapacitor 114 is structured to store sufficient energy. To determine the optimal characteristics of the charger supercapacitor 114, the following parameters about the device supercapacitor 124 are determined: capacitance (C), internal series resistance (R), maximum voltage ($V_{MAX}$), number of cells connected in series/parallel (N), and voltage discharge ratio (d). It is noted that cells refer to capacitors that makeup a supercapacitor. For example, if the device supercapacitor 124 is comprised of two capacitors connected in parallel, N is equal to two. The usable energy ($W_U$) that most be provided by the charger supercapacitor 114 to quickly charge the device supercapacitor 124 is given by the following equation:

$$WU = N\frac{1}{2}CV_{MAX}^2\left(1 - \frac{d^2}{100^2}\right)$$

The sizing of the charger supercapacitor 114 is realized considering that the cells used to makeup the charger supercapacitor 114 are the same size as the cells used in the device supercapacitor 124. The number of cells $N_T$ needed for the charger supercapacitor 114 and their discharge ratio $d_T$ are given by the following two equations:

$$N_T = \frac{N}{2}\left(1 - \left(\frac{d}{100}\right)^2 + \sqrt{4 + \left(1 - \left(\frac{d}{100}\right)^2\right)^2}\right)$$

$$N_T = 50\left(-1 + \left(\frac{d}{100}\right)^2 + \sqrt{4 + \left(1 - \left(\frac{d}{100}\right)^2\right)^2}\right)$$

If the $N_T$ value calculated is not an integer, its value is rounded to the upper integer value. If the $N_T$ value is rounded, the discharge ratio $d_T$ must be recalculated using the following equation:

$$d_T = 100\sqrt{1 - \frac{2W_U}{N_T CV_{MAX}^2}}$$

The amount of time $T_T$ it will take for the power source 102 to completely charge the charger supercapacitor 114 can be obtained using the value of the maximum charging current $I_T$ that the power source 102 can provide. The maximum charging current $I_T$ is given by the following equation:

$$I_T = \frac{-N_T V_{MAX} \pm \sqrt{N_T V_{MAX}^2 + 4N_T RP_T}}{2N_T R}$$

$P_T$ is the maximum power the power source 102 can provide.

Once maximum charging current $I_T$ has been determined, the amount of time $T_T$ it will take to charge the charger supercapacitor 114 can be determined using the following equation:

$$T_T = C\frac{V_{MAX}}{I_T}\left(1 - \frac{d_T}{100}\right)$$

Alternate Embodiment of Device

Figure 1B:
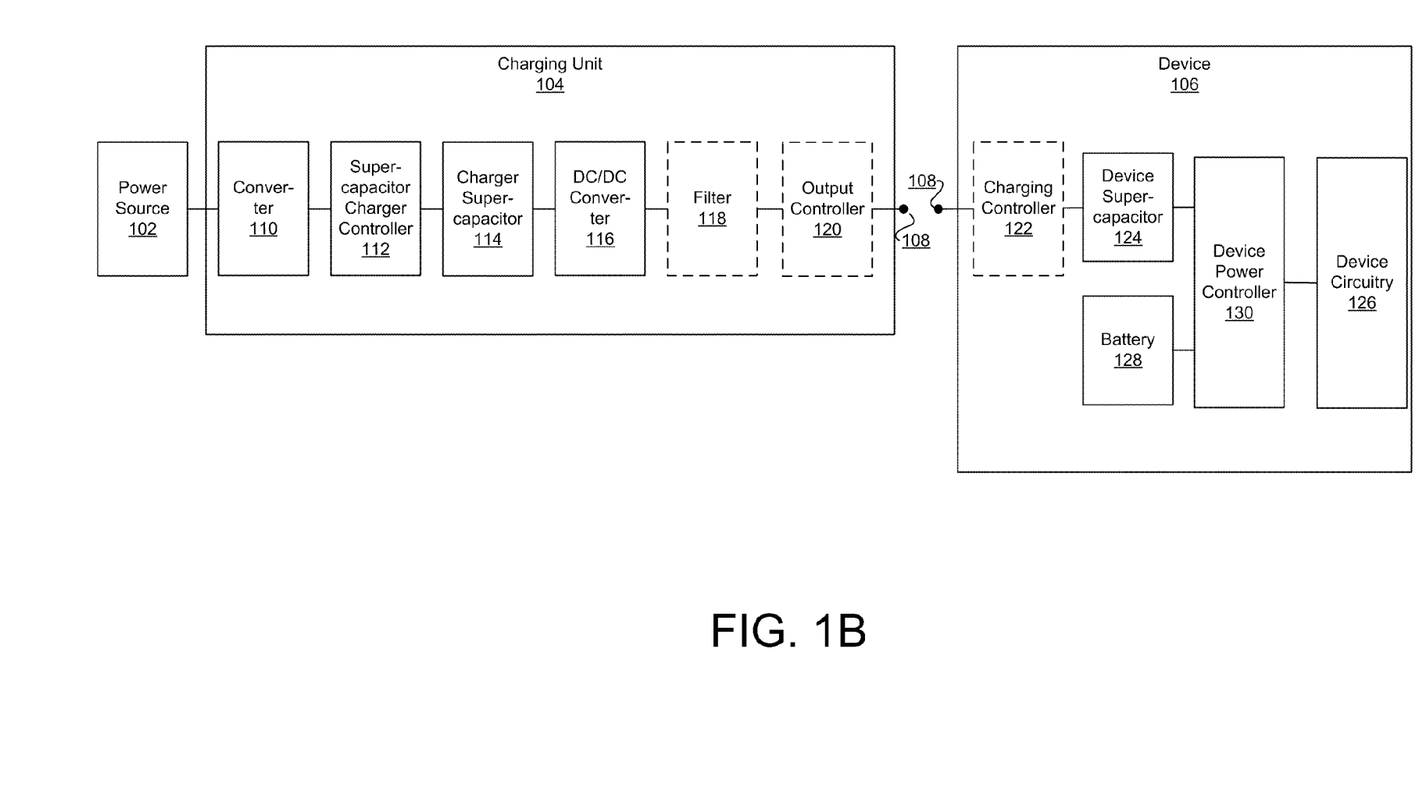
FIG. 1B is a high-level block diagram illustrating the power source, the charging unit, and the device of FIG. 1A according to an alternate embodiment.

FIG. 1B is a high-level block diagram illustrating the power source 102, the charging unit 104, and the device 106 of FIG. 1A according to an alternate embodiment. As can bee seen in FIG. 1B, the power source 102 and the charging unit 104 are configured the same as described in the description of FIG. 1A. Additionally, as in FIG. 1A, the filter 118, the output controller 120, and the charging controller 122 are represented in dashed lines to indicate that components are optional. The device 106 includes the charging controller 122, the device supercapacitor 124, and the device circuitry 126 of FIG. 1A. The device 106 additionally includes a battery 128 and a device power controller 130.

In configurations in which the charging controller 122 is included in the device 106, the charging controller 122 communicates with the output controller 120 to determine if the charging unit 104 is authorized to charge the device 106. If it is determined that the charging unit 104 is authorized to charge the device 106 and the device 106 is coupled to the charging unit 104, the input of the charging controller 122 receives the high current resulting from the release of the stored energy in the device supercapacitor 124. The high current is output by the charging controller 122 to the input of the device supercapacitor 124. The high current charges the device supercapacitor 124. In configuration in which the charging controller 122 is not included in the device 106, the device supercapacitor 124 receives the high current directly from the charging unit 104.

Once the device 106 is no longer coupled to the charging unit 104, the device power controller 130 determines whether to power the device circuitry using the stored energy in the device supercapacitor 124 or the stored energy in the battery 128. In one embodiment, the battery 128 is a wet cell or dry cell battery, such as an alkaline battery. A first input of the device power controller 130 receives current output by the device supercapacitor 124 as result of the device supercapacitor 124 discharging. A second input of the device power controller 130 receives current output by the battery 128. The device circuitry 126 receives current output by the device power controller 130.

In one embodiment, the device power controller 130 first powers the device circuitry 126 using the stored energy in the device supercapacitor 124. Once the device supercapacitor 124 has discharged to a specific voltage, the device power controller 130 uses the stored energy in the battery 128 to power the device circuitry 126.

In another embodiment, the device power controller 130 determines whether to request energy from the device supercapacitor 124 or energy from the battery 128 based on the power needed by the device circuitry 126. Stored energy in the device supercapacitor 124 is used by the device power controller 130 when peak demand of energy is needed by the device circuitry 126. On the other hand, stored energy in the battery 128 is used by the device power controller 130 when energy is needed by the device circuitry 126 for normal operations. For example, if the device circuitry 126 needs quick energy for a short amount of time (e.g., to light up a light-emitting diode (LED)), the device power controller 130 uses the energy stored in the device supercapacitor 124. If the device circuitry 126 needs constant energy for an extended period of time, the device power controller 130 uses the energy stored in the battery 128.

Alternate Embodiment for Charging System Architecture

Figure 1C:
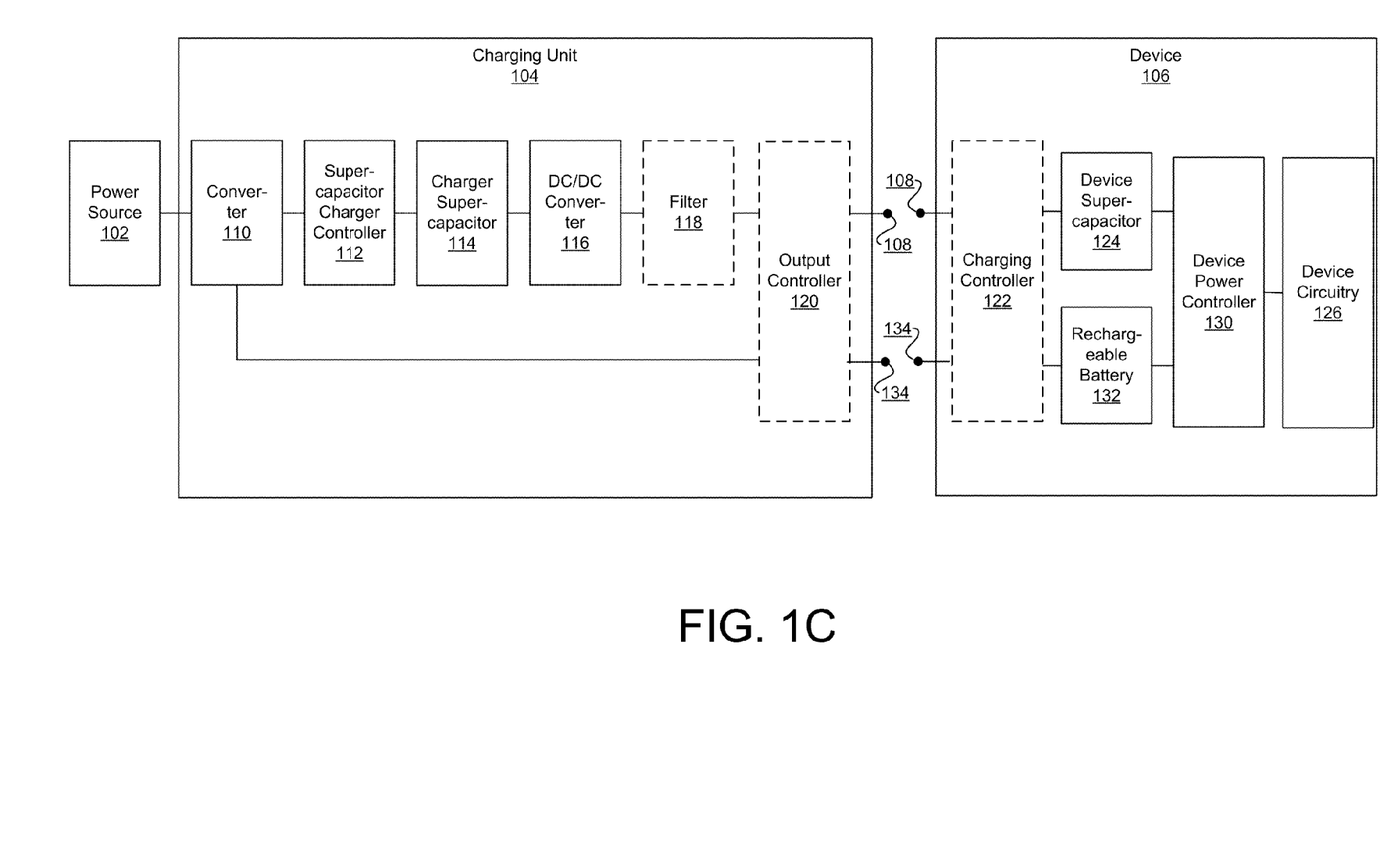
FIG. 1C is a high-level block diagram illustrating the power source, the charging unit, and the device of FIG. 1A according to an alternate embodiment.

FIG. 1C is a high-level block diagram illustrating the power source 102, the charging unit 104, and the device 106 of FIG. 1A according to an alternate embodiment. As in FIGS. 1A and 1B, it should be noted that in FIG. 1C the filter 118, the output controller 120, and the charging controller 122 are represented in dashed lines to indicate that the components are optional. FIG. 1C shows that the charging unit 104 can be used to charge the device supercapacitor 124 and a rechargeable battery 132 included in the device 106. The rechargeable battery 132 may for example be a nickel-metal hydride (NiMH) battery, a lithium-ion (Li-ion) battery, or a lithium-ion polymer battery.

The input of the converter 110 receives a current (AC or DC current) from the power source 102. A first output of the converter 110 transfers a DC current that is used to charge the charger supercapacitor 114. When the device 106 becomes coupled to the charging unit 104 through coupling 108 and coupling 134 and optionally once the output controller 120 has determined that the charging unit 104 is authorized to charge the device 106, the charger supercapacitor 114 discharges to release the stored energy in the charger supercapacitor 114. The release of the stored energy results in a high current being received by a first input of the output controller 120. The output controller 120 transfers the high current through coupling 108 to the charging controller 122. The charging controller 122 transfers the high current through a first output to an input of the device supercapacitor 124. The high current charges the device supercapacitor 124 within a short amount of time.

In one embodiment, while the high current is being output by the output controller 120, the converter 110 transfers through a second output, a low current (e.g., 500 mA) to a second input of the output controller 120. The low current output by the converter 110 is at an appropriate level to be able to recharge the rechargeable battery 132 included in the device 106. The output controller 120 transfers the low current to the charging controller 122 through coupling 134. The charging controller 122 transfers through a second output the low current to the rechargeable battery 132. The low current recharges the rechargeable battery 132 as long as the device 106 remains coupled to the charging unit 104. Therefore, when the device 106 is coupled to the charging unit 104, the charging unit 104 simultaneously charges the device supercapacitor 124 and the rechargeable battery 132 included in the device 106.

In another embodiment, when the device 106 is coupled to the charging unit 104, the output controller 120 first transfers the high current produced by the discharging of the device supercapacitor 124 to the first input of the charging controller 122. The first output of the charging controller 122 transfers the high current to the device supercapacitor 124. The device supercapacitor 124 becomes charged within a short amount of time. Once the device supercapacitor 124 is fully charged and if the device 106 remains coupled to the charging unit 104, the output controller 120 begins to transfer through the second output, a low current to the second input of the charging controller 122. The low current is transferred through the second output of the charging controller to the rechargeable battery 132. The rechargeable battery is charged by the low current until the device 106 is no longer coupled to the charging unit 104. Therefore, the charging unit 104 first charges the device supercapacitor 124 and once the device supercapacitor 124 has been charged, the charging unit 104 charges the rechargeable battery. When the device 106 is no longer coupled to the charging unit 104 the device power controller 130 determines whether to use the stored energy in the device supercapacitor 124 or the stored energy in the rechargeable battery 132 to power the device circuitry 126.

A first input of the device power controller 130 receives current output by the device supercapacitor 124 as result of the device supercapacitor 124 discharging. A second input of the device power controller 130 receives current output by the rechargeable battery 132. The device circuitry 126 receives current output by the device power controller 130. In one embodiment, the device power controller 130 of FIG. 1C functions the same as that of the FIG. 1B, except that the device power controller 130 of FIG. 1C uses the stored energy in the rechargeable battery 132 instead of the battery 128.

Using the charging unit 104 to charge the device supercapacitor 124 and the rechargeable battery 132 is beneficial in that it efficiently increases the device's charge. In the first seconds of the device 106 being coupled to the charging unit 104 the device 106 is provided with instant charge since the device supercapacitor 124 becomes fully charged within those first seconds. The stored energy in the device supercapacitor 124 allows the device 106 to operate for an extended amount of time. If the device 106 remains coupled to the charging unit 104 past the first few seconds, the charging unit 104 takes advantage and charges the rechargeable battery 132, which will allow the device 106 to operate for an even longer amount of time.

Examples of Device

In one embodiment, the device 106 is a piece of equipment that operates on stored energy provided for example by a battery and/or a supercapacitor. One example of such device 106 includes a computer pointing device such as a mouse, trackpad, roller ball, or pen. Another example of such device 106 includes a digital pen that captures handwriting gestures and provides for electronic representation or image generation from same. Yet another example of such device 106 includes a remote control mechanism, e.g., for a television, audio system, video system, computing system and the like. The device 106 may also include portable electronics such as portable music players, portable video players, notebook computers, mobile telephones, video camera, digital cameras, headsets, web cameras, remote controls, speakers, keyboards, and microphones.

The device 106, which integrates with the charging unit 104 as described herein, can also extend to other types of devices. For example, the device 106 may include a vacuum unit such as a robot configured vacuum cleaner unit or portable vacuum unit. Another example of a device 106, which integrates the charging system as described herein, includes personal grooming products (e.g., shavers, trimming products), and any other type of devices that operate on stored energy.

Application of the charging system as described is not limited to the examples provided. Nevertheless, the examples illustrate a benefit of the charging system as disclosed, specifically, the rapid transfer of energy to a device 106 which allows for use of the device 106 within a short amount of time, for example, 3-5 seconds, where the device 106 has otherwise been drawn down in power and would be non-functional until charged conventionally.

Schematic View for Charging System

Figure 2A:
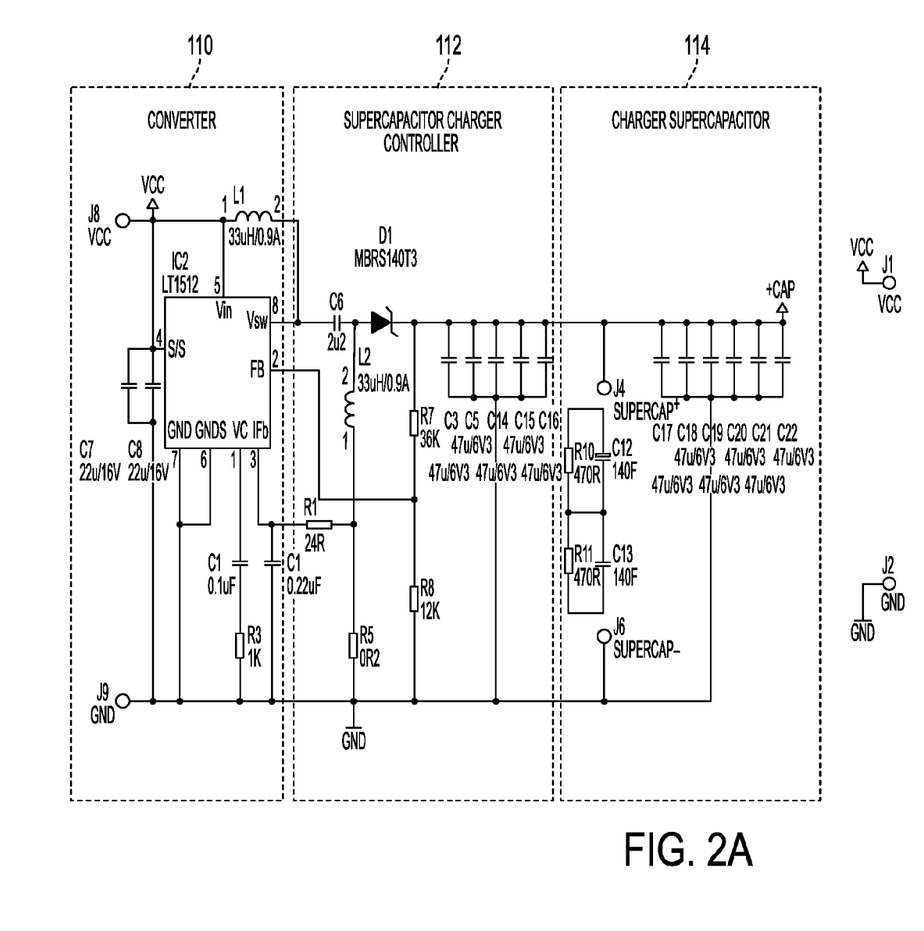
FIGS. 2A and 2B are a schematic view illustrating the charging unit of FIG. 1A and FIG. 1B according to one embodiment.
Figure 2B:
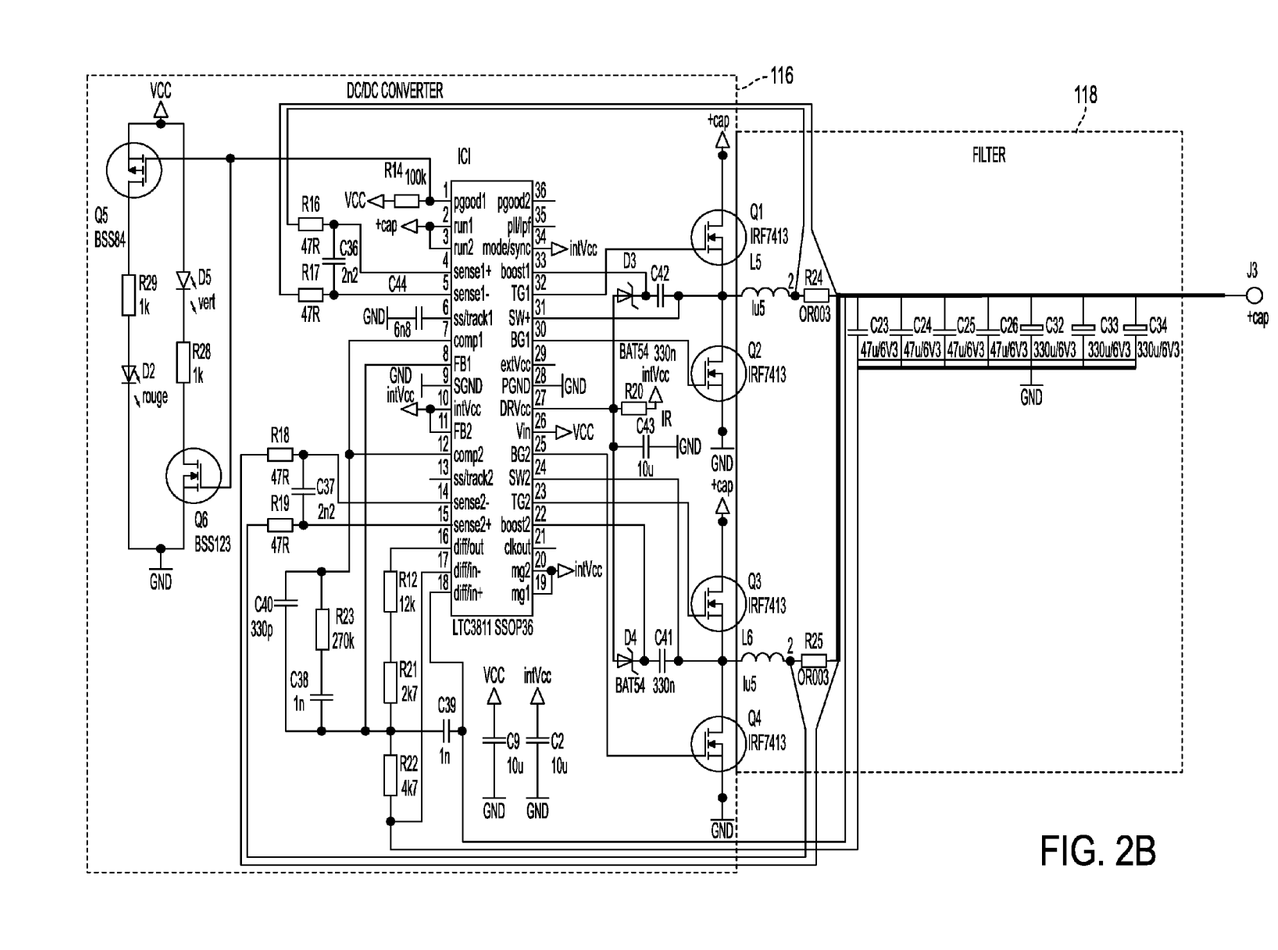

FIGS. 2A and 2B are a schematic view illustrating the charging unit 104 of FIG. 1A and FIG. 1B according to one embodiment. The schematic of FIG. 2A includes circuitry for the converter 110, the supercapacitor charger controller 112, and the charger supercapacitor 114. The schematic of FIG. 2B includes circuitry for the DC/DC converter 116 and the filter 118. The circuitry for each component in FIGS. 2A and 2B is enclosed in dashed lines. In one embodiment, the converter 110 is the LT1512-Sepic Constant-Current/Constant Voltage Battery Charger manufactured by LINEAR TECHNOLOGY of Milpitas, Calif. In one embodiment, the DC/DC converter 116 is the LTC3811-High Speed Dual, Multiphase Step-Down DC/DC Controller manufactured by LINEAR TECHNOLOGY.

Figure 3:
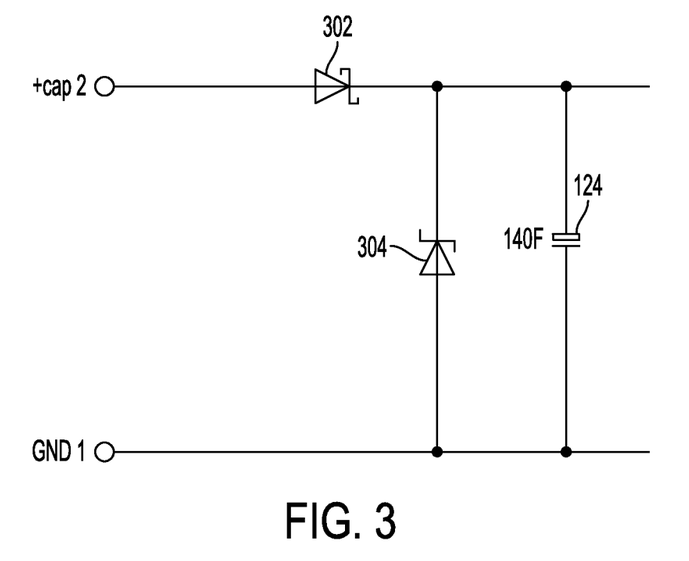
FIG. 3 is a schematic view illustrating the device supercapacitor of FIGS. 1A-1C according to one embodiment.

FIG. 3 is a schematic view illustrating the device supercapacitor 124 of FIGS. 1A-1C according to one embodiment. In this example the device supercapacitor 124 has a capacitance of 140 farads. In parallel with the device supercapacitor 124 is a first diode 304 that protects the device supercapacitor 124 from over voltage. In one embodiment, the first diode 304 is a zener diode. In series with the device supercapacitor 124 and the first diode 304 is a second diode 302 which allows the high current to flow only in the direction of the device supercapacitor 124 and the first diode 304. In one embodiment, the second diode 302 is a schottky diode.

Figure 4:
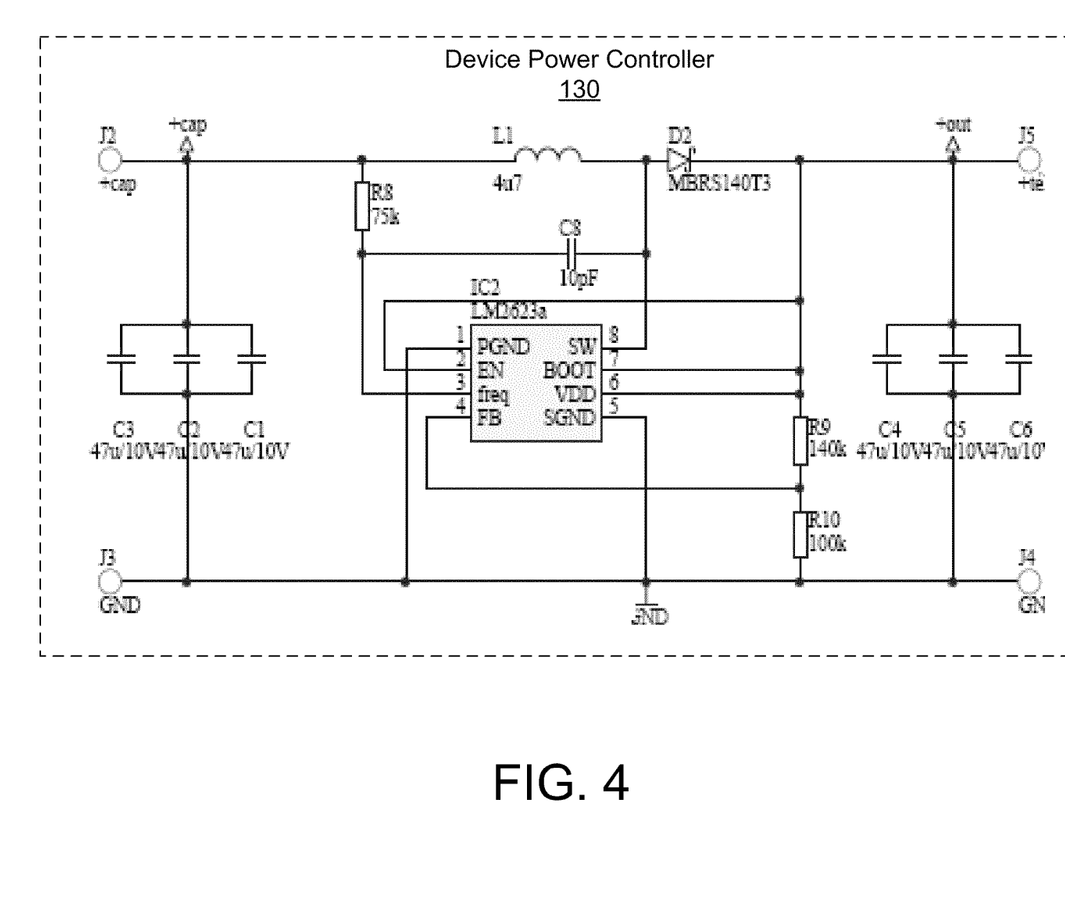
FIG. 4 is a schematic view illustrating the device power controller of FIG. 1B and FIG. 1C according to one embodiment.

FIG. 4 is a schematic view illustrating the device power controller 130 of FIG. 1B and FIG. 1C according to one embodiment. FIG. 4 includes the circuitry of the device power controller 130. In one embodiment, the device power controller 130 includes the LM2623-General Purpose, Gated Oscillator Based, DC/DC Boost manufactured by NATIONAL SEMICONDUCTOR of Santa Clara, Calif.

Process Flow

Figure 5:
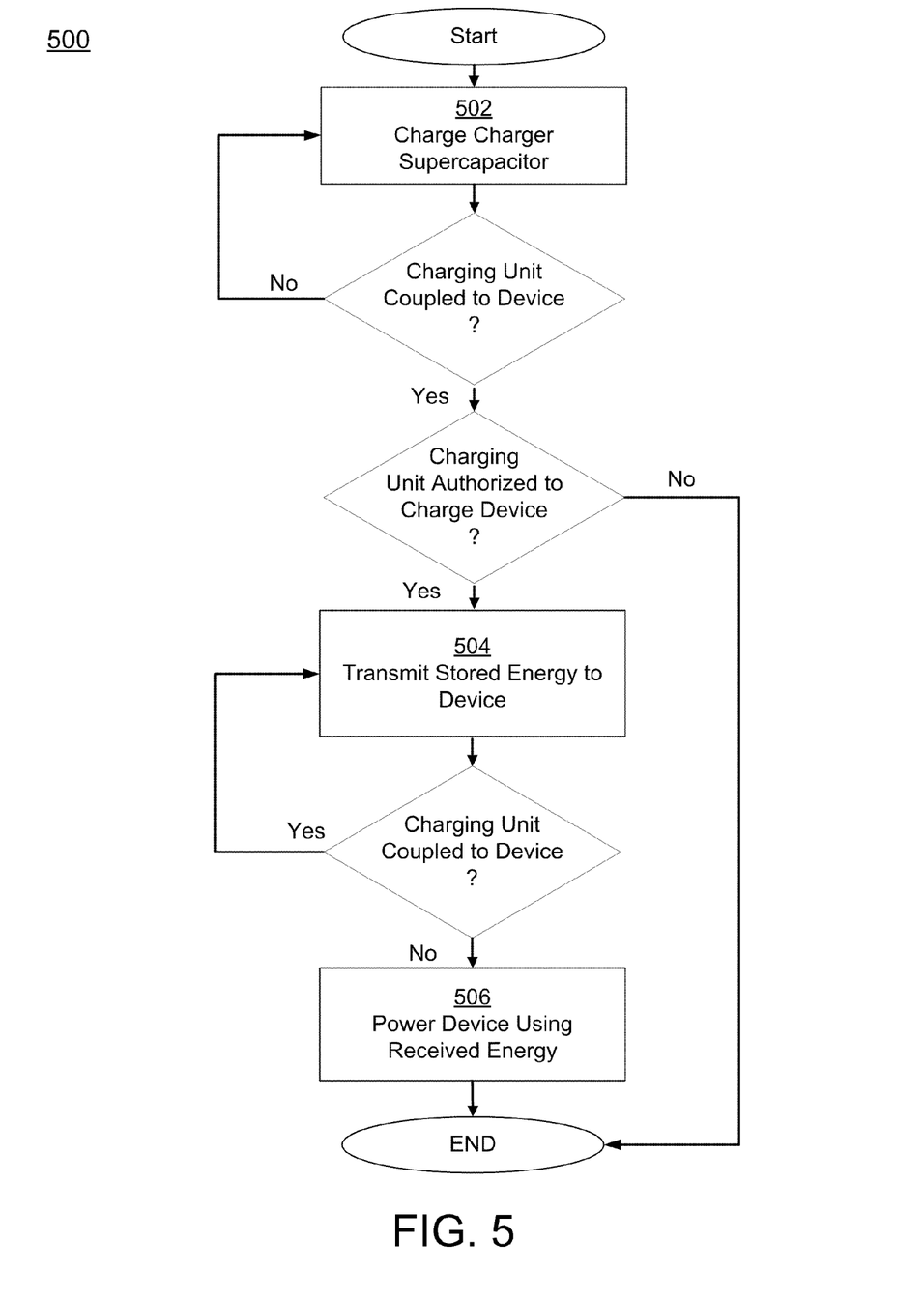
FIG. 5 is a flow chart illustrating a process for the charging unit to instantly charge a device according to one embodiment.

FIG. 5 is a flow chart illustrating a process 500 for the charging unit 104 to instantly charge a device 106 according to one embodiment. Those of skill in the art will recognize that other embodiments can include different and/or additional steps than the ones described here. Additionally it should be recognized that the steps of process 500 are just an example embodiment and that the steps may be performed synchronously or asynchronously.

The charger supercapacitor 114 of the charging unit 104 is charged 502 by current provided by the power source 102. As long as the charging unit 104 is not coupled to a device 106, the charger supercapacitor 114 continues to be charged. If the charging unit 104 is coupled to a device 106, the charging unit 104 communicates with the device 106 to determine whether the charging unit 104 is authorized to charge the device 106. If the charging unit 104 is not authorized to charge the device 106, the charging unit 104 will not transfer energy to the device 106.

Alternatively, if the charging unit 104 is authorized to charge the device 106, stored energy in the charging unit 104 is rapidly transferred 504 to the device 106. The rapid energy transfer allows the device supercapacitor 124 to become fully charged within a short amount of time. If the device 106 remains coupled to the charging unit 104, the stored energy in the charging unit 104 continues to be transferred to the device 106 until the device 106 is fully charged. In one embodiment, once the device 106 is fully charged, the charging unit 104 trickle charges the device 106 by periodically transferring energy to device 106. Trickle charging the device 106 guarantees that the device 106 will stay fully charged as long as the device 106 is coupled to the charging unit 104. In another embodiment, once the device 106 is fully charged, the charging unit 106 does not transfer anymore energy to the device 106 for the rest of the time the device is coupled to the charging unit 104. When the device 106 is decoupled from the charging unit 104, the device 106 is powered using the energy received from charging unit 104.

Figure 6:
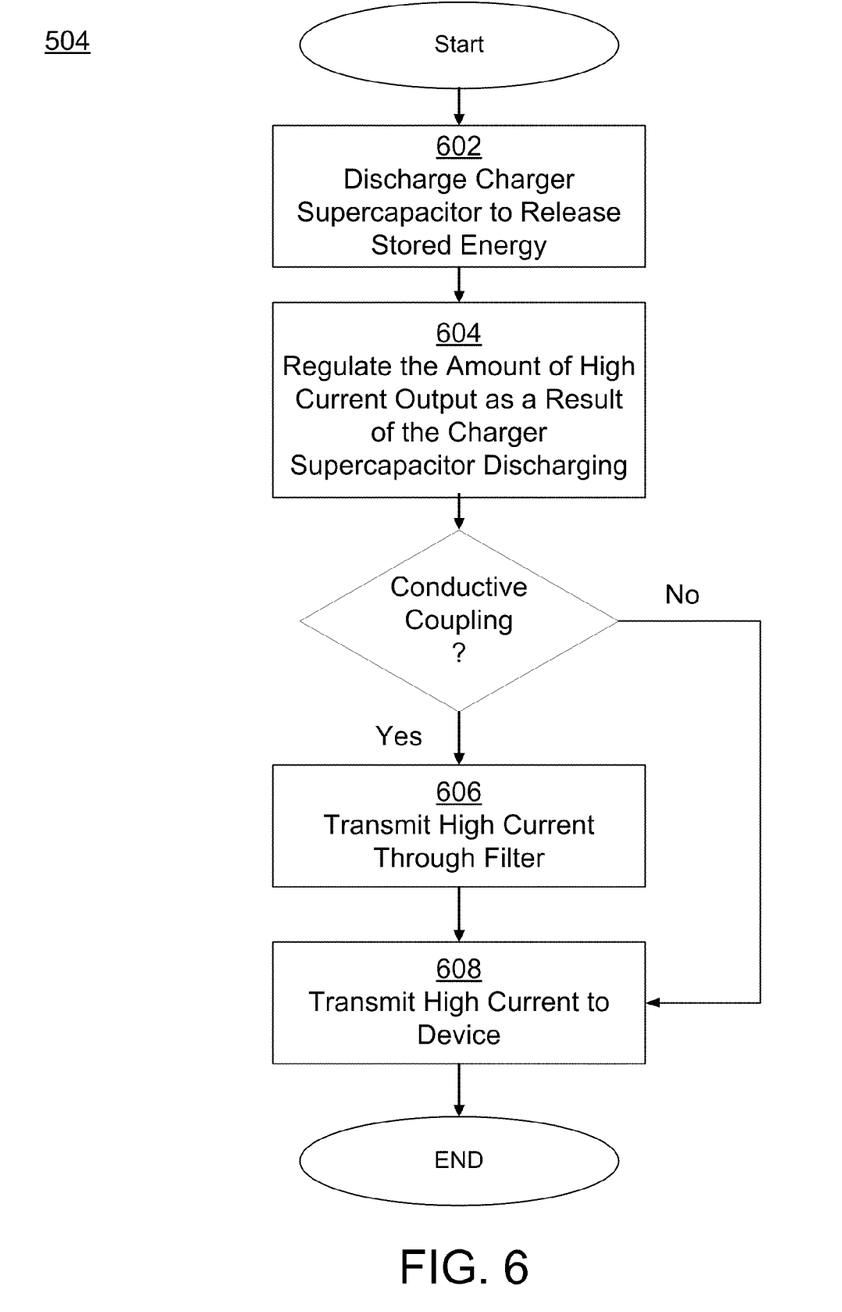
FIG. 6 is a flow chart illustrating a process for rapidly transferring stored energy to a device coupled to the charging unit.

FIG. 6 is a flow chart illustrating a process 504 for rapidly transferring stored energy to a device 106 coupled to the charging unit 104, which is step 504 of FIG. 5. Those of skill in the art will recognize that other embodiments can include different and/or additional steps than the ones described here. Additionally it should be recognized that the steps of process 504 are just an example embodiment and that the steps may be performed synchronously or asynchronously.

When the device 106 becomes coupled to the charging unit 104, the charger supercapacitor 114 discharges 602 to release the stored energy in the charger supercapacitor 114 and quickly transfer the energy to the device supercapacitor 124 attached to the device 106. The release of the stored energy in the charger supercapacitor 114 results in a high current being generated. The DC/DC converter 116 regulates the amount of high current being output as a result of the charger supercapacitor 114 discharging by regulating the output voltage. If the coupling between the charging unit 104 and the device 106 is a conductive coupling, the high current is transferred 606 through the filter 118 to prevent sparks from occurring at the coupling. If the coupling is not a conductive coupling or once the high current goes through the filter, the high current is transferred 608 to the device 106 for charging the device supercapacitor 124.

In one embodiment, the charging unit 104 additionally transfers a low current to the device 106, which is used to charge a rechargeable battery included in the device 106. In one embodiment, the low current is transferred to the device 106 at the same time that the high current is being transferred to the device 106. In another embodiment, the low current is transferred to the device 106 once the device supercapacitor 124 is fully charged.

User Interface

In one embodiment, the charging unit 104 includes a visual characteristic that provides an indication of charging status. For example, the visual characteristic may be a light source, such as a light emitting diode (LED), where the color of the light source indicates to a user the amount of charge in the charger supercapacitor 114. If the charger supercapacitor 114 is fully charged, the light source is a first color. In one embodiment, the first color is green. The charger supercapacitor 114 is considered fully charged when the voltage of the charger supercapacitor 114 is equal to or above a specific voltage, such as the maximum voltage of the supercapacitor 114. The first color indicates to a user of the charging unit 104 that the charger supercapacitor 114 is fully charged and has enough stored energy to rapidly charge a device 106.

If the charger supercapacitor 114 is discharged, the light source is a second color. In one embodiment, the second color is red. The charger supercapacitor 114 is considered discharged when the voltage of the charger supercapacitor 114 is equal to or below a specific voltage. In one embodiment, the charger supercapacitor 114 is considered to be discharged when the voltage of the charger supercapacitor 114 is equal to or below half of its maximum voltage. The second color indicates to a user that the charger supercapacitor 114 is discharged and has no energy to transfer to a device 106. When the charger supercapacitor 114 is in between being fully charged and discharged the light source is a third color. In one embodiment, the third color is orange. The third color indicates to a user that the charger supercapacitor 114 has some charge, but it is not enough to fully charge a device 106.

In one embodiment, a device 106 that couples to the charging unit 104 includes a light source and a speaker. The color of the device's light source indicates to a user the amount of charge in the device supercapacitor 124. If the device supercapacitor 124 is fully charged, the light source is a first color. In one embodiment, the first color is green. The device supercapacitor 124 is considered fully charged when the voltage of the device supercapacitor 124 is equal to or above a specific voltage. The first color indicates to a user that the device supercapacitor 124 is fully charged and has enough stored energy to allow the user to operate the device 106 for an extended period of time.

If the device supercapacitor 124 is discharged, the light source is a second color. In one embodiment, the second color is red. The device supercapacitor 124 is considered discharged when the voltage of the device supercapacitor 124 is equal to or below a specific voltage. The second color indicates to a user that the device supercapacitor 124 is discharged and that the device 106 should be coupled to the charging unit 104 so that the device supercapacitor 124 can be charged. When the device supercapacitor 124 is in between being fully charged and discharged the light source is a third color. In one embodiment, the third color is orange. The third color indicates to a user that the device supercapacitor 124 has some charge.

A speaker included in the device 106 outputs a sound when the device 106 is coupled to the charging unit 104 and a high current is being transferred from the charging unit's charger supercapacitor 114 to the device supercapacitor 124 as the charger supercapacitor 114 discharges. In one embodiment, the sound that is output by the speaker as the high current is being transferred to the device supercapacitor 124 is that of a container being filled, for example, a sound corresponding to filling of a liquid. When the charger supercapacitor 114 stops discharging and the device supercapacitor 124 stops receiving the high current, the speaker outputs a distinct completion indication sound, for example, a "bell" or "bing" sound. The sound notifies the user that rapid transfer of energy from the charger supercapacitor 114 to device supercapacitor 124 is complete.

By way of example, assume that charger supercapacitor 114 is fully charged and therefore the light source on the charging unit 104 is green. Additionally, assume that the device supercapacitor 124 in the device 106 is discharged and therefore the light source on the device 106 is red. When the device 104 is coupled to the charging unit 104, the charger supercapacitor 114 discharges which results in a high current being rapidly transferred from the charger supercapacitor 114 to the device supercapacitor 124. As the high current is being transferred, the device's 106 speaker outputs the sound of a container being filed. Once the charger supercapacitor 114 is no longer fully charged, the light source on the charging unit 104 turns from green to orange. Additionally, once the device supercapacitor 124 has some stored energy as a result of the high current being received from the charger supercapacitor 114, the light source on the device 106 turns from red to orange.

After approximately three to five seconds, the charger supercapacitor 114 becomes discharged and therefore the transfer of high current from the charger supercapacitor 114 to the device supercapacitor 124 stops. As a result, the light source on the charging unit 104 turns from orange to red. On the device 106, the speaker outputs a bing sound. Additionally, the light source on the device 106 turns from orange to green. Although the charging unit 104 and the device 106 have been described as each having a single light source it should be understood that multiple light sources may be used to achieve the same purpose. For example, the charging unit 104 may include a first light source that lights up when the charger supercapacitor 114 is fully charged, a second light source that light up when the charger supercapacitor 114 is discharged, and a third light source that lights up when the charger supercapacitor 114 is in between being fully charged and discharged.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. It should be understood that these terms are intended as synonyms for each other. These terms may be used, for example, to indicate that two or more elements are in direct physical or electrical contact with each other. The terms may also be used to indicate that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of ordinary skill in the art will appreciate still additional alternative structural and functional designs for increasing in multiple steps the load current of a circuit powered by a power distributed network, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

The invention claimed is:

1. A method for rapidly charging a rechargeable device, the method comprising:
charging a first supercapacitor included in a charging unit;
responsive to the device coupling to the charging unit, determining whether the charging unit is authorized to charge the device;
responsive to determining that the charging unit is authorized to charge the device, discharging the first supercapacitor, the discharging of the first supercapacitor resulting in a first current being generated;
transferring the first current to the device through an output of the charging unit for charging a second supercapacitor included in the device;
responsive to a voltage at the output increasing at a rate above a set threshold, reducing, by a filter, the rate at which the voltage is increasing; and responsive to reducing the rate at which the voltage is increasing, preventing, by a converter, the voltage from increasing at the output.

2. A charging unit for rapidly charging a rechargeable device, the charging unit comprising:
   a supercapacitor charger controller configured to control the charging of a first supercapacitor included in the charging unit;
   an output controller configured to determine whether the charging unit is authorized to charge the device in response to the device coupling to the charging unit;
   the first supercapacitor configured to discharge in response to the output controller determining that the charging unit is authorized charge the device, the discharging of the first supercapacitor resulting in a first current being generated and transferred to the device through an output of the charging unit for charging a second supercapacitor included in the device;
   a filter configured to reduce the rate at which a voltage at the output is increasing in response to the voltage at the output increasing at a rate above a set threshold; and
   a converter configured to prevent the voltage from increasing at the output responsive to reducing the rate at which the voltage is increasing.

3. A method for rapidly charging a rechargeable device, the method comprising:
   charging a first supercapacitor included in a charging unit;
   responsive to the device coupling to the charging unit, discharging the first supercapacitor, the discharging of the first supercapacitor resulting in a first current being generated;
   transferring the first current to the device through an output of the charging unit for charging a second supercapacitor included in the device;
   responsive to a voltage at the output increasing at a rate above a set threshold, reducing, by a filter, the rate at which the voltage is increasing; and
   responsive to reducing the rate at which the voltage is increasing, preventing, by a converter, the voltage from increasing at the output.

4. The method of claim 3, wherein charging a first supercapacitor further comprises:
   responsive to measuring a voltage of the first supercapacitor at a maximum voltage of the first supercapacitor, stopping the charging of the first supercapacitor.

5. The method of claim 3, wherein discharging the first supercapacitor further comprises:
   responsive to measuring a voltage of the first supercapacitor at half of a maximum voltage of the first supercapacitor, stopping the discharging of the first supercapacitor.

6. The method of claim 3, wherein discharging the first supercapacitor further comprises:
   responsive to receiving from the device an indication that the second supercapacitor is fully charged, stopping the discharging of the first supercapacitor.

7. The method of claim 3, wherein discharging the first supercapacitor comprises:
   determining whether the charging unit is authorized to charge the device; and
   responsive to determining that the charging unit is authorized to charge the device, discharging the first supercapacitor.

8. The method of claim 7, wherein determining whether the charging unit is authorized to charge the device comprises:
   receiving an identification code from the device;
   comparing the received identification code to a plurality of stored identification codes; and
   responsive to the identification code matching one of the plurality of stored identification codes, determining that the charging unit is authorized to charge the device.

9. The method of claim 7, wherein determining whether the charging unit is authorized to charge the device comprises:
   transmitting a first signal to a radio frequency identification (RDIF) tag of the device;
   receiving a second signal from the RFID tag;
   identifying the RFID tag based on the second signal;
   comparing the RFID tag to a stored set of RFID tags; and
   responsive to the RFID tag matching an RFID tag included in the stored set, determining that the charging unit is authorized to charge the device.

10. The method of claim 3, further comprising regulating the amount of the first current being transferred to the device.

11. The method of claim 3, further comprising:
    transferring a second current to the device through an additional output of the charging unit for charging a rechargeable battery included in the device.

12. The method of claim 11, wherein the second current is transferred at the same time as the first current is being transferred.

13. The method of claim 11, wherein the second current is transferred in response to stopping the transfer of the first current and the device remaining coupled to the charging unit.

14. The method of claim 3, wherein the device is a computer mouse, a remote control, a mobile telephone, or a keyboard.

15. A charging unit for rapidly charging a rechargeable device, the charging unit comprising:
    a supercapacitor charger controller configured to control the charging of a first supercapacitor;
    the first supercapacitor configured to discharge in response to the device coupling to the charging unit, the discharging of the first supercapacitor resulting in a first current being generated and transferred to the device through an output of the charging unit for charging a second supercapacitor included in the device;
    a filter configured to reduce the rate at which a voltage at the output is increasing in response to the voltage at the output increasing at a rate above a set threshold; and
    a converter configured to prevent the voltage from increasing at the output responsive to reducing the rate at which the voltage is increasing.

16. The charging unit of claim 15, wherein the supercapacitor charger controller is further configured to:
    stop the charging of the first supercapacitor in response to measuring a voltage of the first supercapacitor at a maximum voltage of the first supercapacitor.

17. The charging unit of claim 15, wherein the converter is further configured to:
    stop the discharging of the first supercapacitor in response to measuring a voltage of the first supercapacitor at half of a maximum voltage of the first supercapacitor.

18. The charging unit of claim 15, wherein the converter is further configured to:
    stop the discharging of the first supercapacitor in response to receiving from the device an indication that the second supercapacitor is fully charged.

19. The charging unit of claim 15, further comprising:
    an output controller configured to determine whether the charging unit is authorized to charge the device; and
    the first supercapacitor configured to discharge in response the output controller determining that the charging unit is authorized to charge the device.

20. The charging unit of claim 19, wherein the output controller is further configured to:

receive an identification code from the device;

compare the received identification code to a plurality of stored identification codes; and determine that the charging unit is authorized to charge the device in response to the identification code matching one of the plurality of stored identification codes.

21. The charging unit of claim 19, wherein the output controller is further configured to:

transmit a first signal to a radio frequency identification (RFID) tag of the device;

receive a second signal from the RFID tag;

identify the RFID tag based on the second signal;

compare the RFID tag to a stored set of RFID tags; and determine that the charging unit is authorized to charge the device in response to the RFID tag being included in the stored set of RFID tags.

22. The charging unit of claim 15, wherein the converter is further configured to regulate the amount of the first current being transferred to the device.

23. The charging unit of claim 15, further comprising a second converter configured to transfer a second current to the device through an additional output of the charging unit for charging a rechargeable battery included in the device.

24. The charging unit of claim 23, wherein the second current is transferred at the same time as the first current is being transferred.

25. The charging unit of claim 23, wherein the second current is transferred in response to stopping the transfer of the first current and the device remaining coupled to the charging unit.

26. The charging unit of claim 23, wherein the device is a computer mouse, a remote control, a mobile telephone, or a keyboard.

* * * * *